United States Patent

[11] 3,583,667

| [72] | Inventor | William T. Amneus, Jr.<br>5440 Alhambra Ave., Los Angeles, Calif. 90032 |
|---|---|---|
| [21] | Appl. No. | 842,165 |
| [22] | Filed | July 16, 1969 |
| [45] | Patented | June 8, 1971 |

[54] QUICK-DISCONNECT COUPLING
3 Claims, 7 Drawing Figs.

[52] U.S. Cl. ..................................................... 251/149.5,
251/149.6, 285/86, 285/376
[51] Int. Cl. ............................................................. F16l 29/00,
F16l 21/02, F16l 32/24
[50] Field of Search ........................................... 251/149.5,
149.6; 285/84, 85, 86, 360, 376, 401, 403

[56] References Cited
UNITED STATES PATENTS

| 2,459,477 | 1/1949 | Van Schuyver | 251/149.5 |
| 3,079,178 | 2/1963 | Simpkins | 285/360X |

*Primary Examiner*—William R. Cline
*Attorney*—Lyon & Lyon

ABSTRACT: A quick-disconnect coupling which includes a first or fixed coupling assembly having an internal seal intended to receive a tubular tip of a second or removable coupling assembly, and a sliding valve member having a normally closed forward position from which it is forced to an open position by entry of the tip of the removable coupling assembly. The fixed coupling assembly is also provided with a forwardly spaced intermittent internal flange. The removable coupling assembly is provided with a channel to receive the internal flange which is interrupted to permit axial movement of the internal flange onto the second unit whereupon the units may be turned relatively to interlock the flange and channels. A sleeve is axially movable on the second unit and is adapted to occupy a position locking the assemblies against relative rotation and separation.

PATENTED JUN 8 1971

3,583,667

INVENTOR.
WILLIAM T. AMNEUS, JR
BY
*Lyon Lyon*
ATTORNEYS

QUICK-DISCONNECT COUPLING

BACKGROUND OF THE INVENTION

Quick-disconnect couplings for use between air supply lines and various air-operated tools are in wide use. Such couplings are relatively large in diameter and add appreciable weight which has a tiring effect when the tool or series of tools are used over long periods of time. It is essential that such couplings be capable of connection as quickly as possible without danger of misconnection wherein the tool may be propelled away by air pressure with the possibility of injury to the user, or the tool or the work on which the tool is being used. Also, it is essential that once connected, the coupling will not be accidentally disconnected even if the tool and supply line are roughly handled, dragged about a shop or otherwise misused. Still further, it is essential that although the coupling is safe against accidental disconnection, it be capable of ready and quick disconnection when desired. Finally, it is essential that the coupling include a dependable seal when the coupling is disconnected to prevent loss of air from the line and when the coupling is connected to ensure delivery of the air to the tool.

SUMMARY OF THE INVENTION

This invention presents a solution to the problems outlined above and is summarized in the following objects:

First, to provide a quick-disconnect coupling wherein the diameter, and hence its weight, is minimal for a selected air capacity without sacrifice of strength or dependability.

Second, to provide a quick-disconnect coupling which is particularly easy to connect and disconnect, yet when connected, is secure against accidental disconnection.

Third, to provide a quick-disconnect coupling which incorporates a simple and novelly arranged valve means to effect a seal when the coupling is disconnected and to provide minimal impedance to flow when the coupling is connected and including further a seal means to prevent side escape of air when the coupling is connected.

Fourth, to provide a quick-disconnect coupling which incorporates a novel mechanical connecting and locking means including interrupted internal flanges and external channel means capable of relative axial movement, then relative rotational movement to interlock, and an axially movable rotation locking sleeve.

Figure 1:
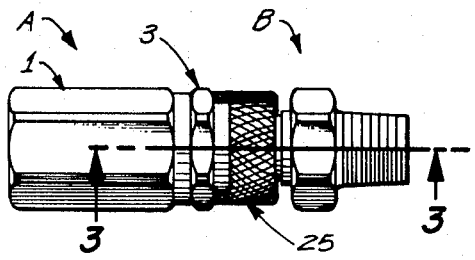
FIG. 1 is a side view of the quick-disconnect coupling, as it appears when the parts are connected.

The quick-disconnect coupling includes a fixed coupling assembly A and a removable coupling B.

The fixed coupling assembly includes a tubular body 1, having an internally screw-threaded mounting end 2, adapted for connection to a fitting provided at the end of an air supply line, not shown. The opposite end of the body 1 is provided with a latching collar 3, joined thereto by screw threads 4. The latching collar 3 includes a bore 5, having near its outer end, an internal channel 6 which is interrupted by a transverse slot 7, so as to form, axially outward from the channel 6, a pair of keeper ribs 8.

Immediately inwardly from the channel 6, the latching collar is provided with an internal groove which receives an O-ring seal 9. The inner end of the latching collar is enlarged, forming a counterbore 10. Slidably mounted in the bore 5 and counterbore 10, is a cylindrical valve body 11, having a socket 12 formed in its outer end, intersected by radial ports 13. The inner end of the valve body 11 is enlarged and provided with an external channel which receives an O-ring 14.

The axially inner end of the valve body 11 is provided with a spring retainer knob 15, to which is attached one end of a conical spring 16, the other end of which bears against a shoulder 17 provided within the body 1.

The removable coupling assembly B includes a body 18, having an externally screw-threaded mounting end 19. The opposite end forms an insertion tip 20, adapted to be received in the bore 5 of the latching collar 3. Adjacent the insertion tip, the body 18 forms a guide 21 of larger diameter than the insertion tip. The portion of the guide 21 adjacent the insertion tip is provided with diametrically opposed flats 22, so spaced as to be received in the transverse slot 7. The flats are interrupted by an external channel 23 so as to form an interrupted circular flange forming diametrically disposed latching ribs 24, dimensioned to be received in the internal channel 6, so that when the bodies 1 and 18 are turned the latching ribs 24 engage the keeper ribs 8.

The guide 21 receives a locking ring 25, having opposed bosses 26 which ride on the flats 22 to prevent rotation of the locking ring. The bosses are dimensioned to be received in the transverse slot 7. The axially inner end of the guide 21 is provided with a retainer flange 27 over which the axially inner end of the locking ring 25 extends. This end is provided with an internal retainer flange 28 radially overlapping the retainer flange 27.

Except for portions of the locking ring 25 adjacent its axially outer end, the locking ring 25 is spaced from the guide 21 so as to receive a spring 29 which urges the locking ring toward the insertion tip 20.

Figure 2:
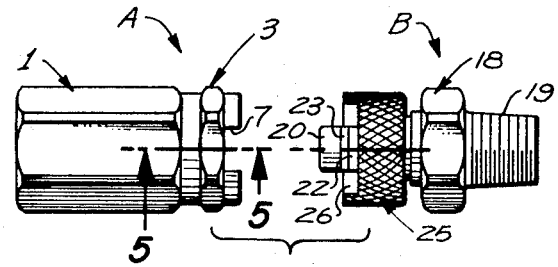
FIG. 2 is another side view thereof, taken at right angles to FIG. 1, with the parts shown disconnected.
Figure 3:
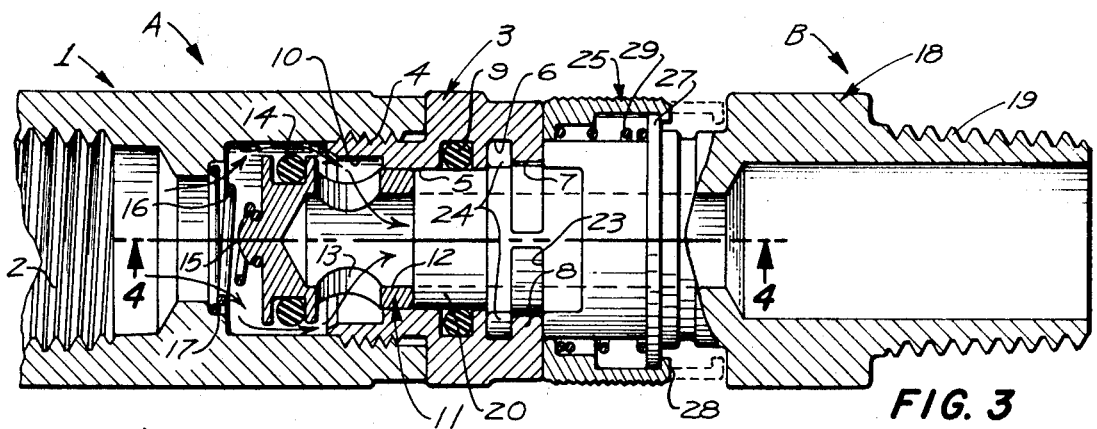
FIG. 3 is an enlarged fragmentary longitudinal sectional view, taken through 3-3 of FIG. 1, showing the parts connected.

Operation of the quick-disconnect coupling is as follows:

When the assemblies A and B are separated from each other, and oriented for connection to each other, they appear as shown in FIG. 2; that is, the flats 22 are in registry with the transverse slot 7. When the two assemblies are moved axially toward each other, the insertion tip 20 enters the bore 5 until the latching ribs align with the channel 6. This movement forces the locking ring 25 backward on the body 18. When the latching ribs are in alignment with the internal channel 6, the assemblies may be rotated relative to each other 90°, whereupon the bosses 26 snap into the transverse slot 7, securing the two assemblies together.

Figure 5:
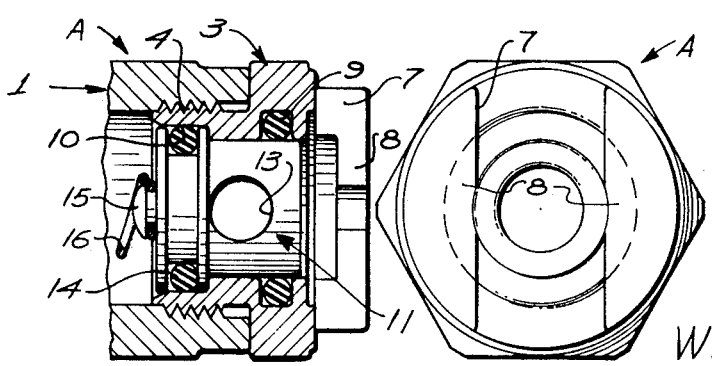
FIG. 5 is a fragmentary sectional view, showing the fixed coupling assembly, taken through 5-5 of FIG. 2.
Figure 7:
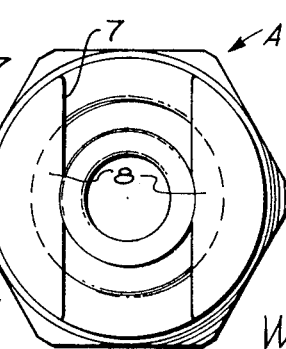
FIG. 7 is a corresponding enlarged end view of the fixed coupling assembly.

When the assemblies are separated, the valve body 11 is in its axially forward position, shown in FIG. 5, and the O-ring 14 forms a sealing connection with the latching collar 3, which is joined in sealing relation to the body 1. When the tip 20 is inserted, the valve body 11 is forced axially inward until the O-ring 14 clears the counterbore 10, so that fluid may pass around the O-ring 14, through the radial ports 13 and socket 12, so as to flow through the bore of the body 18.

When it is desired to separate the assemblies, it is merely necessary to draw backward on the locking ring 25, turn the assemblies relatively 90° to bring the flats 22 in alignment with the transverse slot 7. Both springs 16 and 29 provide a force tending to separate the assemblies.

It should be noted that when separating the assemblies, the locking ring need be held in its retracted position only until the bosses 26 are misaligned with the slot 7. Then, on further relative turning of the assemblies, they will snap free of each other when the bosses 26 align with the transverse slot 7.

It should also be noted that on assembly, the locking ring 25 need not be directly engaged; that is, the tip 20 may be partially inserted to align the two assemblies, and then the two assemblies pressed toward each other and turned until the flats 22 are received in the slot 7, then while pressed toward each other, the assemblies are further turned until the locking ring 25 automatically snaps in place.

Figure 4:
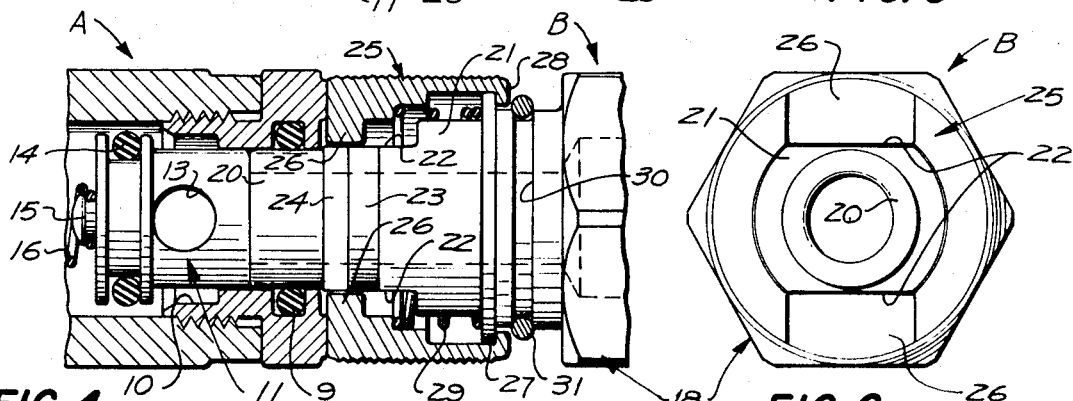
FIG. 4 is a fragmentary sectional view, taken through 4-4 of FIG. 3
Figure 6:
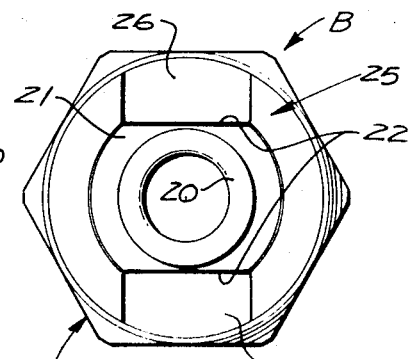
FIG. 6 is an enlarged end view of the removable coupling assembly.

It will be noted that because a combination of deliberate movements are required, that is, the collar must be manually retracted and the two assemblies relatively rotated before disconnection can be achieved, that it is virtually impossible to effect a disconnection accidentally. However, should it be desirable to establish a permanent connection, which cannot be disassembled without a tool, the region axially inward from the locking ring 25 may be provided with an annular groove 30 which may receive a split ring 31, as shown in FIG. 4. If desired, the split ring may be a conventional ring requiring a special tool to remove.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:
1. A quick-disconnect coupling, comprising:
   a. a first tubular body having an internal circumferentially extending channel adjacent one end, a transverse slot intersecting the internal channel to form diametrically opposed latch elements axially outward from said channel;
   b. a second tubular body having an insertion tip receivable in the first body, an external circumferentially extending flange, and opposed flat sides interrupting and spaced for reception in the slot in the first body, thereby to place said flange in registry with said channel, said bodies being relatively rotatable to cause interengagement of the interrupted flange and the latch elements; and
   c. a locking ring slidably but nonrotatably mounted on the second body and including diametrically opposed axially extending locking elements adapted to be received in the slot to secure the flange and latch elements in their interengaged relation.

2. A quick-disconnect coupling, as defined in claim 1, wherein:
   a. the first body is provided with an axially slidable valve means adapted to provide communication through the bodies when the insertion tip of the second body is received in the first body, and adapted to seal the first body when the insertion tip is removed therefrom.

3. A quick-diconnect coupling, as defined in claim 2 wherein:
   a. the first body is provided with an internal seal ring engageable with said insertion tip; and
   b. said valve means is provided with an external seal engageable with the bore of the first body when the valve bodies are separated.